US006663079B1

(12) United States Patent
Bottenfield

(10) Patent No.: US 6,663,079 B1
(45) Date of Patent: Dec. 16, 2003

(54) RESILIENT SEAT GATE VALVE

(75) Inventor: Jerry Bottenfield, Oskaloosa, IA (US)

(73) Assignee: McWane, Inc., Birmingham, AL (US)

( * ) Notice: Subject to any disclaimer, the term of this patent is extended or adjusted under 35 U.S.C. 154(b) by 7 days.

(21) Appl. No.: 10/198,027

(22) Filed: Jul. 18, 2002

(51) Int. Cl.[7] ................................................ F16K 3/00
(52) U.S. Cl. ..................................... 251/328; 251/326
(58) Field of Search ................................ 251/328, 326

(56) References Cited

U.S. PATENT DOCUMENTS

| 1,801,960 A | | 4/1931 | Houser |
|---|---|---|---|
| 1,823,394 A | | 9/1931 | Geiger |
| 2,793,002 A | | 5/1957 | Kellar |
| 2,820,479 A | | 1/1958 | Jenkins, Jr. |
| 2,824,715 A | | 2/1958 | Williams |
| 2,982,295 A | | 5/1961 | Williams |
| 3,002,525 A | | 10/1961 | Grove |
| 3,027,135 A | | 3/1962 | Kellar |
| 3,377,049 A | | 4/1968 | DeFrees |
| 3,478,771 A | | 11/1969 | Johnson |
| 3,662,778 A | * | 5/1972 | Leopold et al. ............. 251/326 |
| 3,917,223 A | | 11/1975 | Sidler |
| 3,945,606 A | | 3/1976 | McDonald |
| 3,963,214 A | | 6/1976 | Hackman et al. |
| 3,996,750 A | | 12/1976 | Brcar |
| 4,356,838 A | | 11/1982 | Morello |
| 4,541,613 A | | 9/1985 | Barbe |
| 4,629,160 A | | 12/1986 | David |
| 4,646,777 A | | 3/1987 | Stalder |
| 4,742,990 A | | 5/1988 | Stalder |
| 5,295,661 A | | 3/1994 | Roussel |

OTHER PUBLICATIONS

Clow Valve Co., Brochure for Clow Resilient Wedge Valve (4 pages—undated).

* cited by examiner

*Primary Examiner*—John Bastianelli
(74) *Attorney, Agent, or Firm*—Fitch, Even, Tabin & Flannery

(57) ABSTRACT

A valve arrangement includes a valve housing that defines a product passageway and a valve seat within the product passageway. A valve wedge is disposed within the housing passageway, and moves along a direction of operation between a closed position and an open position. A pair of opposed wings are carried on the valve wedge, adjacent a guide track. Rollers are carried on the wings for rolling engagement with the tracks and scraper blades are carried on the wings adjacent the rollers to scrape contamination from tracks.

18 Claims, 5 Drawing Sheets

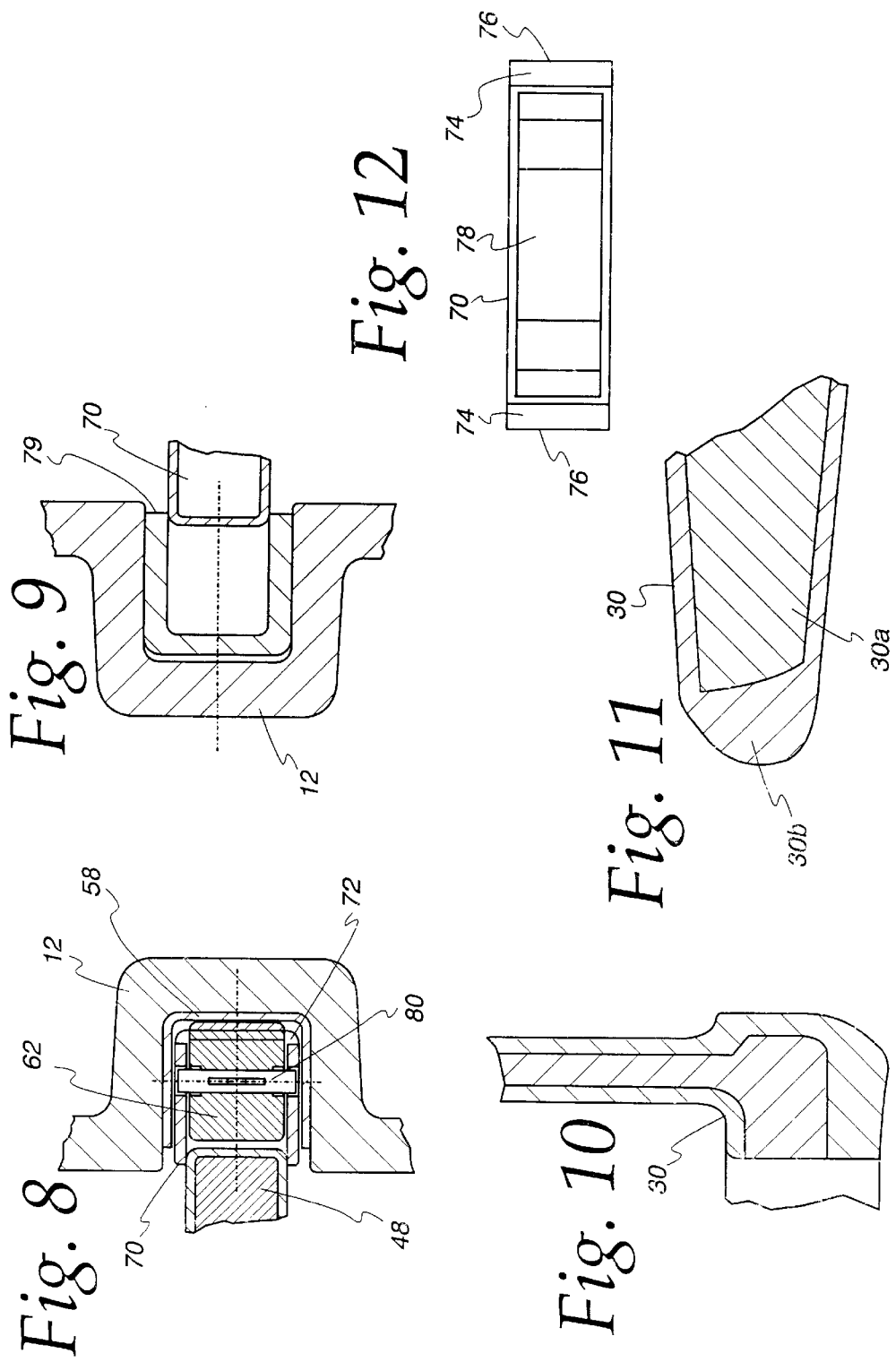

RESILIENT SEAT GATE VALVE

BACKGROUND OF THE INVENTION

1. Field of the Invention

The present invention pertains to gate valves, and in particular to resilient seat gate valves.

2. Description of the Related Art

Resilient seat gate valves are employed in the transport of clean water. The valve gate or closure member is typically in the form of a wedge made of cast iron material so as to be sufficiently rugged so as to be suitable for high pressure and high flow applications. In a resilient seat gate valve, the outer surface of the valve wedge is coated with an elastomeric material so as to offer a bubble-tight seal even at elevated operating pressures. The valve wedge is operated by turning a threaded stem so as to advance or retract the valve wedge within the waterway of the valve housing. Upon valve closure, the resilient material on the edge forms a bubble-tight seal with the internal surface of the valve body. Dirt or other contamination in the valve operating system can lead to incomplete sealing of the wedge or other malfunction.

SUMMARY OF THE INVENTION

It is an object of the present invention to provide a resilient seat gate valve.

Another object of the present invention is to provide a resilient seat gate valve having an improved wedge operator system which readily overcomes the deleterious effects of contamination introduced either during construction or entrained within product carried to the valve.

These and other objects of the present invention which will become apparent from studying the appended description and drawings are provided in a valve arrangement, that comprises a valve housing that defines a water passageway and a valve seat within the valve passageway. A valve wedge disposed within the housing passageway moves along a direction of operation between a closed position in contact with the valve seat to block flow of water through the valve passageway and an open position allowing flow of water through the valve passageway. A pair of spaced apart tracks are disposed within the valve housing on either side of the wedge and extend along the direction of operation. A pair of opposed wings carried on the valve wedge, travel in each track. A valve stem coupled to the valve wedge moves the valve wedge in opposite reciprocating directions between valve open and valve closed positions. Rollers are carried on the wings for rolling engagement with the tracks and scraper blades are carried on the wings adjacent the rollers to scrape contamination from the tracks. The tracks may be provided with or without a liner. If a wing is provided without rollers because of a light loading application, for example, the track is preferably provided without a liner. A light loading condition may arise, for example, at the upper end of a horizontally oriented valve arrangement. However, under heavy loading conditions as, for example, at the bottom end of a horizontally operated valve arrangement, it is preferred that the wings be provided with load bearing rollers. In this instance, it is also preferred that the track be provided with a liner of generally U-shaped cross-section and made of a rugged material such as stainless steel.

BRIEF DESCRIPTION OF THE DRAWINGS

FIG. 8 is a fragmentary cross-sectional view taken along the line 8—8 of FIG. 1;

FIG. 9 is a fragmentary cross-sectional view taken along the line 9—9 of FIG. 1;

FIG. 10 is a fragmentary cross-sectional view taken along the line 10—10 of FIG. 4;

FIG. 11 is a fragmentary cross-sectional view taken along the line 11—11 of FIG. 4; and FIG. 12 is a top plan view of a scraper member thereof.

DETAILED DESCRIPTION OF THE PREFERRED EMBODIMENT

Figure 1:
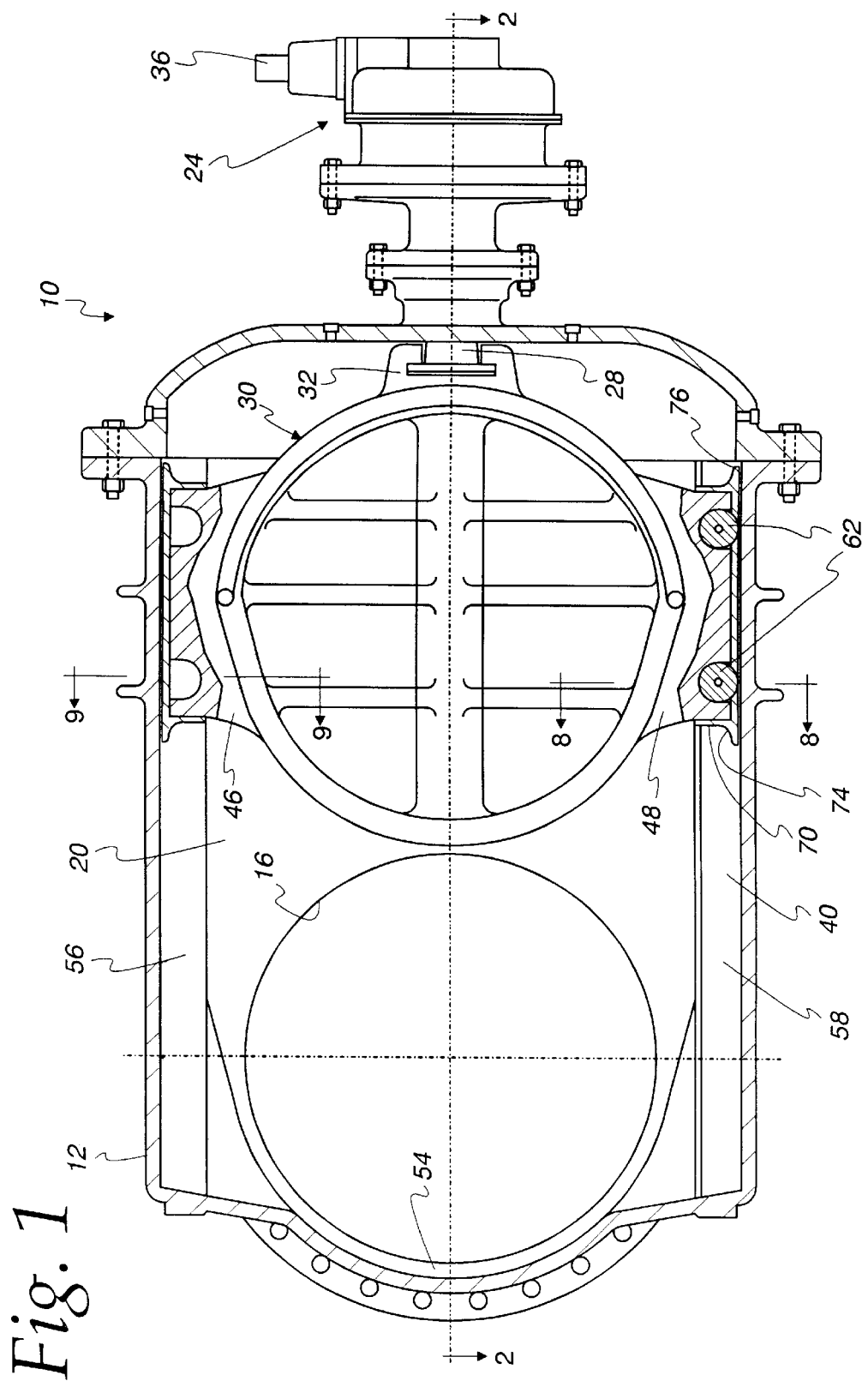
FIG. 1 is an elevational view of a resilient seat gate valve arrangement according to principles of the present invention.
Figure 2:
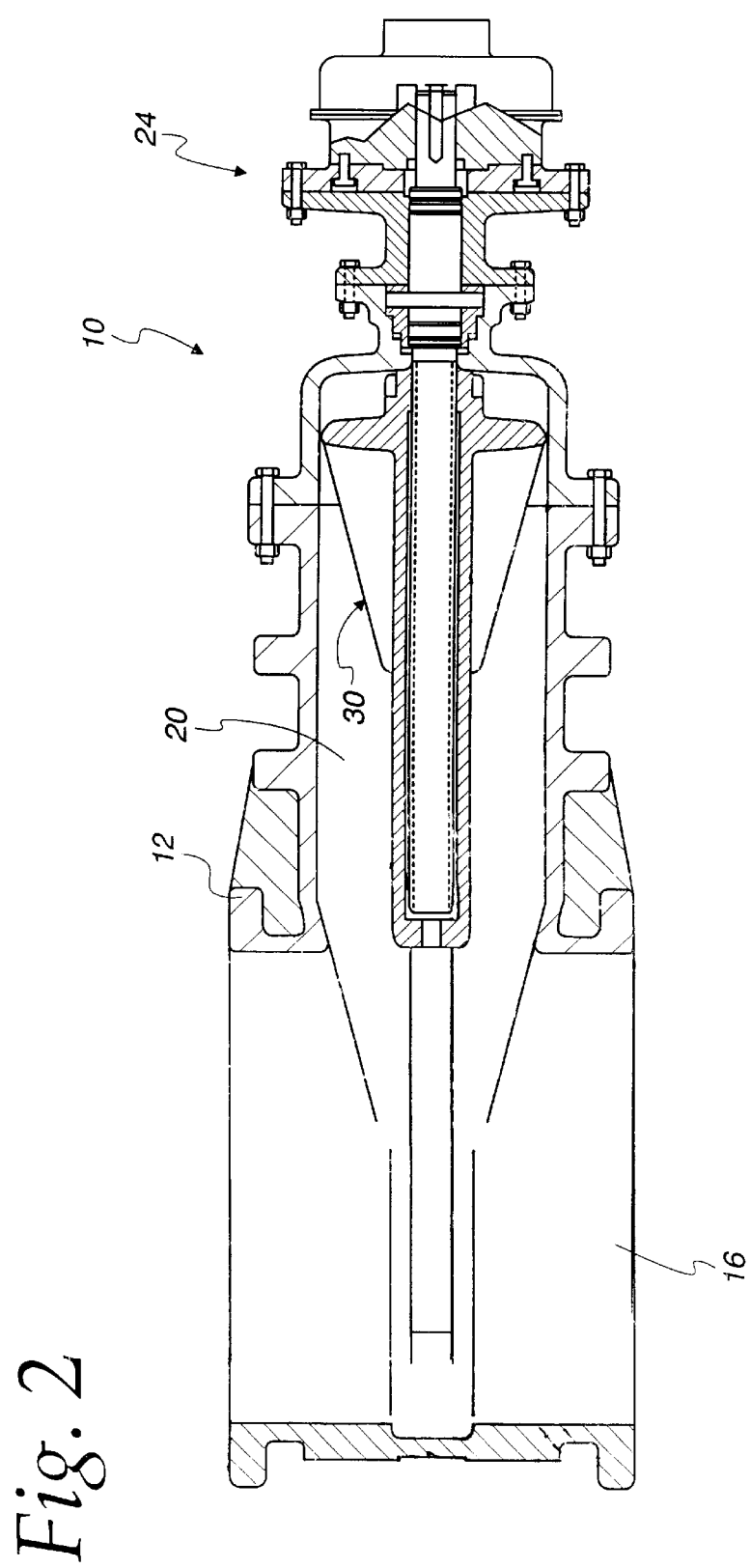
FIG. 2 is a cross-sectional view taken along the line 2—2 of FIG. 1.

Referring now to the drawings, and initially to FIG. 1, a resilient seat gate valve arrangement is generally indicated at 10. The arrangement includes a valve body 12 having an internal wall defining a waterway 16 and a valve wedge passageway 20. An operator assembly 24 includes a valve stem nut 28 which is secured in the upper end 32 of a gate or valve wedge 30. Valve wedge 30 is covered with a conventional resilient coating comprised of a moldable, elastomer or other suitable material. As will be seen herein, the valve member offers an improved operation with a minimum of additional expense and without requiring unusual or costly manufacturing procedures.

In the exemplary embodiment illustrated, valve arrangement 10 is of a relatively massive construction, accommodating flow pressures of several hundred psi and relatively large flow rates. The valve assembly has found immediate commercial acceptance in waterway applications, according to the American Water Works Association C-500 and C-515 Standards, and is especially useful in larger size valves 24 inches through 48 inch sizes, as well as 2 inches through 24 inch sizes.

In use, a rotational force is applied to a drive or input shaft 36 of an actuator or operator assembly 24. This in turn causes the valve stem nut 28 to extend in an outward direction (to the left, in FIG. 1). This causes the valve wedge 30 to advance in a leftward direction in FIG. 1, so as to block the waterway 16, thus moving the valve arrangement from the open position shown in FIG. 1 to a closed position. Upon reversal of the rotational force, the valve wedge is returned to a fully opened position.

As mentioned, valve assembly 10 is of relatively massive construction and, when a larger size valve is installed below ground, it is preferably installed in the orientation illustrated in FIG. 1 with drive shaft 36 pointing in a generally upward direction. As will be seen herein, rollers 62 are provided to support the weight of the valve wedge 30 and to aid in guiding the valve wedge between valve open and valve close positions. As will be appreciated by those skilled in the art, dirt, debris or other accumulation tends to build up at the bottom portion 40 of the valve assembly over time, thus impeding the free movement of the valve wedge.

Of course, when small valve sizes are employed or when a larger valve arrangement is installed above ground or is installed at a sufficient depth below grade, the valve assembly may be oriented in what may be termed an "upright" position with the valve wedge traveling in a generally vertical direction. In this latter arrangement, a need still arises for guiding the valve wedge as it is moved between its closed and open positions, and it is desirable that any debris accumulated in the tracks guiding the rollers 62 and wedge 30 are cleared so as to permit desired, free movement of the valve wedge.

Figure 3:
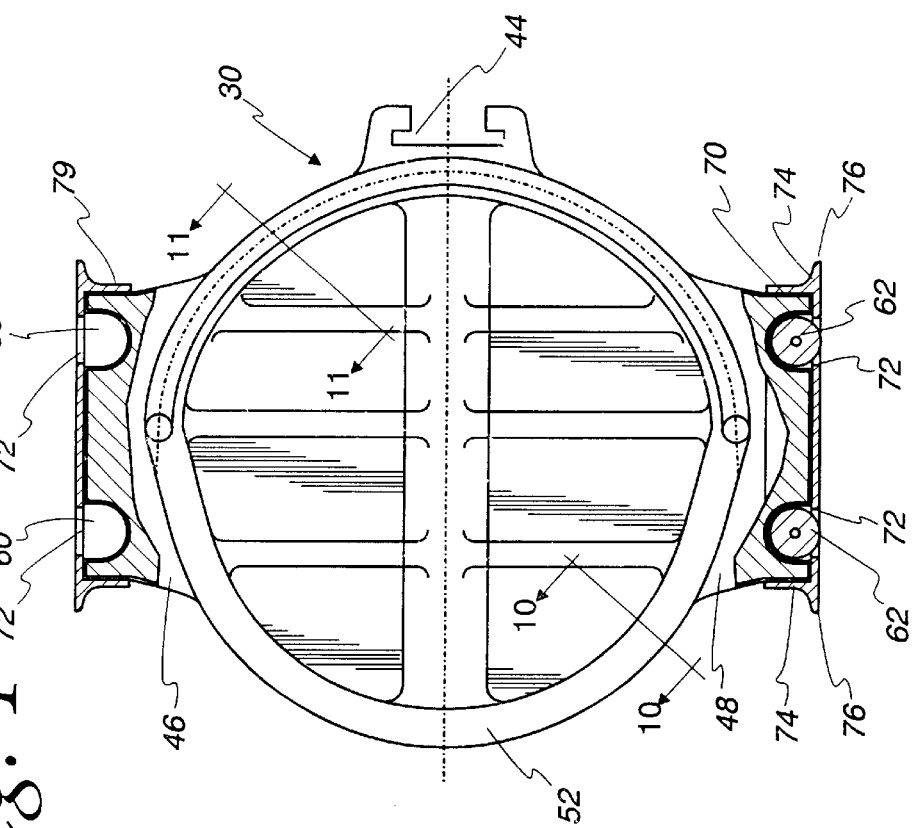
FIG. 3 is an elevational view of the valve wedge member with the scraper and rollers thereof.

Turning now to FIG. 3, valve wedge 30 defines a slot 44 at its end portion 32, to provide ready coupling with valve stem nut 28. Valve wedge 30 has a pair of protrusions or wings 46, 48 formed on either side of the valve center line 50. Valve wedge 30 includes a seating portion 52 which mates with a channel 54 (see FIG. 1) to provide valve seating. As mentioned, wings 46, 48 are located opposite one another on either side of a valve wedge center line 50. With reference to FIG. 1, the valve wings 46, 48 are located adjacent respective tracks 56, 58 which extend generally parallel to the valve center line, in the direction of valve wedge movement.

Figure 4:
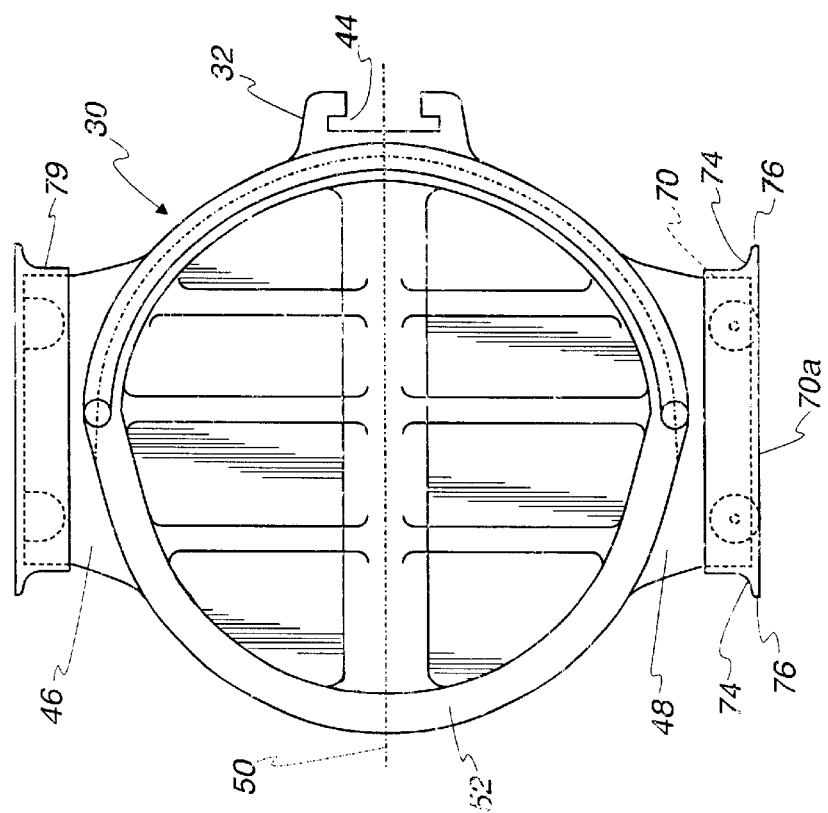
FIG. 4 is an elevational view of the valve wedge member thereof, shown in partial section.

With reference to FIGS. 3 and 4, scraper members 79, 70 are located at the top and bottom of the valve wedge, respectively. In the illustrated embodiment, the valve arrangement is intended for a so-called horizontal orientation with the valve wedge traveling back and forth in a horizontal direction. Both scraper members define sockets 60 for receiving rollers 62. As illustrated, rollers 62 are omitted in the upper scraper member 79 since it is not required to sustain gravity loads as with the lower scraper member 70. In the illustrated embodiment, it is preferred that lower scraper member 70 be formed of a metal composition, most preferably an aluminum bronze alloy. The upper scraper member 79 bears substantially lighter loadings, given the horizontal orientation of the valve arrangement. Accordingly, it is preferred that the upper scraper member 79 be formed of a lighter weight material such as nylon. If desired, the sockets can be omitted from the upper scraper member 79 since rollers are not required in that member, in the preferred embodiment. If the orientation of the valve cannot be determined beforehand or if a user desires, the upper scraper member 79 can be made of identical construction to that of the lower wing 48 described above. In this alternative embodiment, rollers would also be provided in the sockets of the upper scraper member 79.

In the preferred embodiment illustrated for example in FIG. 1, the upper track 56 differs from the lower track 58. The upper track 56 preferably comprises a hollow channel which guides the travel of the upper wing 46. Lower track 58 preferably comprises a channel similar to that of track 56 with the addition of an U-shaped stainless steel track insert. If a user should require the upper scraper member 79 to be of heavier construction and to be provided with rollers 62, then it is preferred that a stainless steel insert be provided to line the upper channel or track 56 making the construction identical to that of the lower track 58.

With additional reference to FIG. 3, scraper members 70, 79 are installed on each wing, and include openings 72 to allow rollers 62 (when present) to protrude so as to contact their respective tracks. As will be seen herein, the scraper members provide rotational mounting for the rollers 62 which are preferably formed of bronze or other suitable material. With additional reference to FIG. 12, scraper members 70 are of an integral construction with an opening 78 for receiving the wings. Radiused portions 74 are located on either end of scraper 70, terminating at acute edges 76.

Referring to FIGS. 1 and 8, and initially to FIG. 8, it can be seen that the housing 12 forms a depression or recess within which a U-shaped liner for track 58 is located. A pin 80 preferably of, but not limited to, stainless steel material holds roller 62 captive within the side walls of scraper 70. As mentioned, roller 62 protrudes through opening 72 so as to contact the bight portion of the liner for track 58. The liner for track 58 is preferably formed of stainless steel material. As can be seen in FIG. 8, the track liner fits within a complementary-shaped channel or groove formed in the housing. The track liner may be secured within the housing by epoxy bonding or other conventional attachment methods, such as a force fit, or outwardly protruding barbs from the track liner which engages the housing. As mentioned above, the channel illustrated in FIG. 8 is provided as the upper track 56 shown in FIG. 1. If the upper and lower scraper members 79, 70 are to be made of identical dimensions then an insert is provided for the upper channel for dimensioning purposes. Alternatively, the upper scraper member 79 can be provided with a width dimension increased to account for the absence of a stainless steel track liner.

As can be seen in FIG. 8, the scraper member 70 extends from wing 48. With reference to FIGS. 1, 3 and 12, for example, the scraper members 79, 70 are inserted over the wings 46, 48 with substantial portions of the wings being received within the central openings 78 of the scraper members. If desired, the scraper members may be permanently affixed to the wings using epoxy bonding or other conventional fastening techniques. The scraper members may be placed over the wings without provision for permanent attachment, since they will be held captive in the final assembly (see FIG. 1, for example). However, it is generally preferred that the scraper members be maintained at a predetermined close spacing with respect to the tracks. In order to ensure that proper spacing is maintained throughout the operational life of the valve assembly, some form of rigid attachment of the scraper member to the wings may be required. As shown in FIG. 8, scraper 70 is dimensioned for a close fit within channel 58. If desired, no further arrangement need be provided to hold pin 80 captive within the scraper due to the press fit of pin 80 within roller 62. Referring to FIG. 9, the roller, pin and track have been removed and replaced with a polymeric scraper 79.

Figure 5:
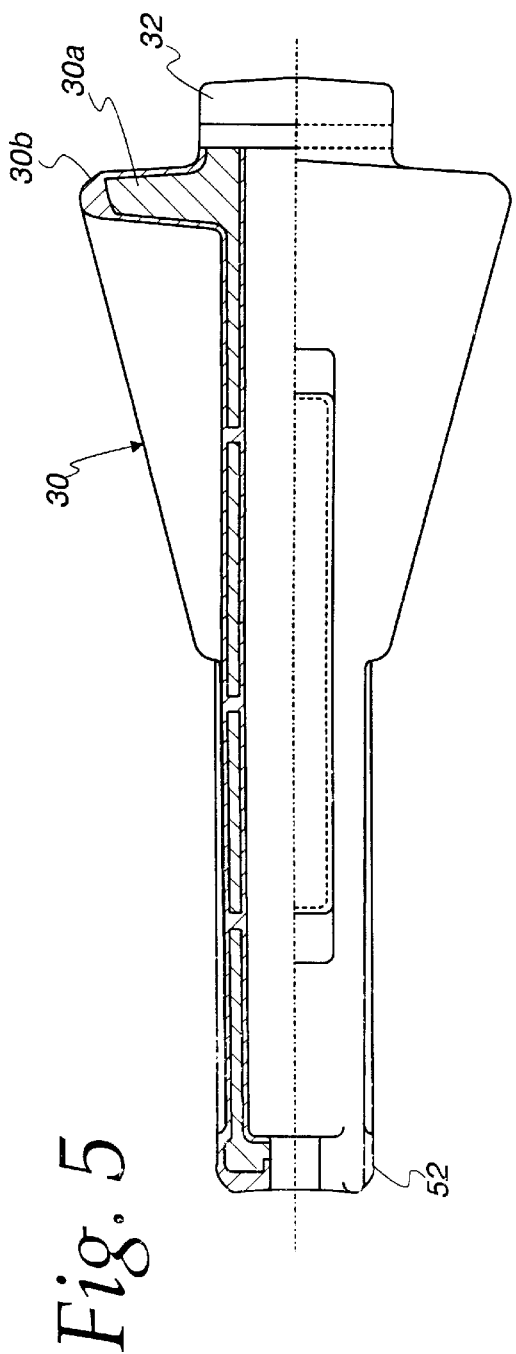
FIG. 5 is a plan view of the valve wedge member of FIG. 3, shown in partial section.
Figure 7:
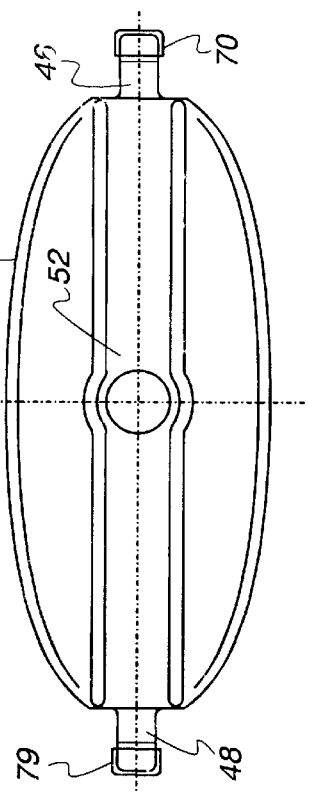
FIG. 7 is a side view of the valve wedge member of FIG. 3 taken from the left side thereof.
Figure 6:
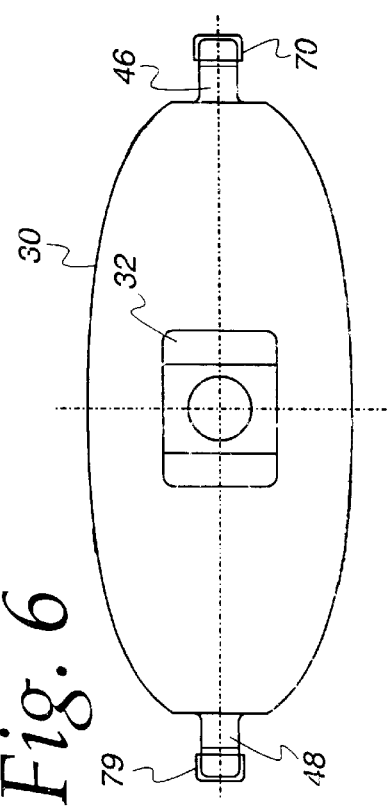
FIG. 6 is a side view of the valve wedge member of FIG. 3, taken from the right side thereof.

Referring to FIGS. 5, 10 and 11, the valve wedge, as mentioned, preferably comprises a rigid inner core 30a such as cast iron or other conventional material, covered with an outer resilient coating 30b of elastomer or other composition. As can be seen from the drawings, the valve wedge 30 has a relatively complex three-dimensional shape, with varying cross-sectional shapes and thicknesses throughout. The preferred hollow construction of the scrapers provides secure engagement with wings 46, 48 despite changes in cross-sectional shape of the valve wedge. Referring to FIG. 1, for example, the relatively deep insertion of the wings within the central opening of the scraper members provides secure retention of the scraper members during scraper operations, preventing tilting or racking of the scraper members with respect to the valve wings, thus preserving parallelism and accurate spacing of the bottom surface 70a (see FIG. 3) of the scraper member.

With reference to FIGS. 1 and 8, as the valve wedge is moved back and forth between open and closed positions, rollers 62 make contact with the mid-portion of tracks 56, 58. The acute angle edges 76 of the scrapers are located very close to the bight portions of tracks 58 and 79. As may be seen for example in FIG. 1, the acute angle cleaning edges 76 are located below, or outward of the roller centers. Further, as indicated in FIG. 1, and as pointed out above the scraper body overlies a substantial portion of the valve wedge wing. These features cooperate to enhance the stability of the acute angle cleaning edge, as the edge traverses the tracks 56, 58. This imparts a mechanical advantage and mechanical stability to the acute angle edges 76, allowing the edges to "cut through" and remove debris accumulated in the tracks 56, 58. Referring to FIG. 3, it will be seen that the acute angle edges 76 are formed at the bottom edge 70a of the scraper member, at a point well below the center line of the rollers, and at a point very close to the track. As will be discussed below, this arrangement provides enhanced stability of the scraper member during a scraper operation.

With valve arrangements oriented in the manner indicated herein, with the valve wedge traveling back and forth in generally horizontal directions, debris will, under gravitational forces, tend to accumulate in the lower track. Due to the substantial weight of valve wedge 30 and the relatively small contact area of roller 62, debris and other foreign material tends to be tightly packed within the C-shaped tracks. Accordingly, the accumulated debris tends to be relatively hard and tightly held to the track surfaces. Considerable force must therefor be applied to dislodge the debris from the track, as the valve is moved back and forth between closed and open positions. As noted above, it is generally preferred that a pair of scraper blades be provided for each wing, so as to perform debris-clearing functionality in both directions of valve wedge travel. This arrangement also disposes increased mass "behind" each cleaning edge 76 making the scraper members more rugged and providing the support needed to withstand the substantial forces encountered in horizontally operated valve arrangements which encounter debris or contamination of the tracks.

As indicated above, it is generally preferred that the acute angle scraping edges be spaced from the bight portion of the tracks, and this is also true of the side portions of the scraper blades with respect to the end portions or side wall portions of the tracks. Contact between the scraper blades and the tracks would, over prolonged number of operations cause the tracks to wear out prematurely. However, if too great a clearance is allowed, free rolling travel of the valve wedge would encounter interference. For a 30" resilient seat gate valve, clearance between the track bight portion and the acute angle scraping edge 76 is held at approximately 0.035" clearance.

As mentioned, the scraper edges are formed at an acute angle sufficient to plow or dig under accumulated sediment so as to break the sediment free from the tracks. It is generally preferred that the angle of the scraper blades be held to a value of 30° or less.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A valve arrangement, comprising:
    a valve housing defining a product passageway and a valve seat within the product passageway;
    a valve wedge disposed within the housing passageway, movable along a direction of operation between a closed position in contact with the valve seat to block flow of a product through the product passageway and an open position allowing flow of product through the product passageway;
    a pair of spaced apart tracks disposed within the valve housing on either side of said wedge and extending along the direction of operation;
    a pair of opposed wings carried on the valve wedge, one adjacent each track;
    a valve stem coupled to the valve wedge for moving the valve wedge in opposite reciprocating directions between said valve open and said valve closed positions;
    rollers carried on at least one of said wings for rolling engagement with said tracks; and
    a scraper body with a pair of scraper blades to scrape contamination from said tracks, the scraper body carried on said wings adjacent the rollers.

2. The valve arrangement of claim 1 wherein said at least one of said valve wings includes a body with a free edge extending along the track defining cavities for receiving said rollers.

3. The valve arrangement of claim 1 wherein said at least one of valve wing includes a body with a free edge extending along the track defining outwardly facing recesses for receiving said rollers.

4. The valve arrangement of claim 3 wherein said tracks are concave in cross section.

5. The valve arrangement of claim 3 wherein said tracks are U-shaped in cross section.

6. The valve arrangement of claim 3 wherein said tracks are U-shaped in cross section with at least one of said tracks including a liner having a pair of opposed side walls and an intermediate bight wall.

7. The valve arrangement of claim 6 wherein said direction of operation is generally horizontal with said opposed wings comprising an upper wing and a lower wing and said rollers are mounted to said bottom wing so as to support a substantial portion of the weight of said valve wedge.

8. The valve arrangement of claim 6 wherein said rollers are of predetermined diameter and said side walls have a height substantially equal to said predetermined diameter.

9. The valve arrangement of claim 1 wherein said valve wedge has a seating portion with a curved free edge positioned to one side of said wings.

10. The valve arrangement of claim 1 wherein the scraper blades are carried on a scraper body having a hollow central portion for receiving said wings.

11. The valve arrangement of claim 10 wherein the scraper blades have an acute angle edge.

12. The valve arrangement of claim 11 wherein the scraper blades have curved surface portions facing away from said tracks.

13. A valve wedge for use in a valve housing having a pair of opposed tracks extending along a direction of operation, the valve wedge comprising:
    a valve body defining a product passageway and a valve seat within the product passageway;
    a pair of opposed wings carried on the valve body, one adjacent each track;
    a valve stem coupled to the valve wedge for moving the valve wedge in opposite reciprocating directions between said valve open and said valve closed positions;
    rollers carried on at least one of said wings for rolling engagement with said tracks to render said valve wedge movable along the direction of operation between a closed position in contact with the valve seat to block flow of a product through the product passageway and an open position allowing flow of product through the product passageway; and a scraper body with a pair of scraper blades to scrape contamination from said tracks, the scraper body carried on said wings adjacent the rollers.

14. The valve arrangement of claim 13 wherein at least one of said valve wings include a body with a free edge extending along the track defining outwardly facing recesses for receiving said rollers.

15. The valve arrangement of claim 14 wherein said direction of operation is generally horizontal with said opposed wings comprising an upper wing and a lower wing and said rollers are mounted to said bottom wing so as to support a substantial portion of the weight of said valve wedge.

16. The valve arrangement of claim 13 wherein the scraper blades are carried on a scraper body having a hollow central portion for receiving said wings.

17. The valve arrangement of claim 16 wherein the scraper blades have an acute angle edge.

18. The valve arrangement of claim 17 wherein the scraper blades have curved surface portions facing away from said tracks.

* * * * *